United States Patent [19]

Tseng

[11] Patent Number: 4,900,049
[45] Date of Patent: Feb. 13, 1990

[54] BICYCLE FRAME

[76] Inventor: Ike Diing-Huang Tseng, P.O. Box 56, Yuanlin, Taiwan, 510

[21] Appl. No.: 2,864

[22] Filed: Jan. 13, 1987

[51] Int. Cl.⁴ .............................................. B62K 19/22
[52] U.S. Cl. .................................. 280/281.1; 156/294; 228/154; 228/165; 403/265; 403/268; 403/292
[58] Field of Search .................... 280/281 R, 274, 275, 280/270; 180/218, 219; 403/265, 266, 268, 269, 292; 29/458, 527.2, 525; 156/293, 294; 228/154, 165

[56] References Cited

U.S. PATENT DOCUMENTS

| | | | |
|---|---|---|---|
| 3,030,124 | 4/1962 | Holloway | 280/281 R |
| 3,966,230 | 6/1976 | Nicol | 280/281 R |
| 4,135,961 | 1/1979 | Yoshizawa | 156/294 |
| 4,145,068 | 3/1979 | Toyomasu | 280/274 |
| 4,561,670 | 12/1985 | Takada | 280/281 R |
| 4,583,755 | 4/1986 | Diekman | 403/292 |
| 4,598,922 | 7/1986 | Kleinebenne | 280/281 R |
| 4,648,616 | 3/1987 | Diekmann | 280/281 R |

FOREIGN PATENT DOCUMENTS 2523541 9/1983 France .............................. 280/281 R Primary Examiner—Mitchell J. Hill
Attorney, Agent, or Firm—Kenyon & Kenyon

[57] ABSTRACT

A bicycle frame having an improved lug design is disclosed. The inner lug has a first external diameter and a second external diameter with the first external diameter being longer than the second external diameter the circumference of the second external diameter has at least two flanges which are shorter than the length of the second external diameter. The circumference about these flanges is equal to the circumference about the first external diameter of the lug. The tube to which the inner lug is joined has a first internal diameter and second internal diameter, the first internal diameter being at the free end of the tube and larger than the other external diameter. The length of the first internal diameter is at least equal to the sum of the length of the first external diameter and the flanges of the inner lug. The second internal diameter of the outer lug is larger than the second external diameter of the inner lug.

3 Claims, 4 Drawing Sheets

BICYCLE FRAME

This invention relates to the art of bicycle making in general and the fabrication of joints in bicycle frames in particular.

It has long been known to form bicycle frames from hollow metal tubes. These tubes are joined at their ends to form a frame upon which the various other components can be mounted. Traditionally, the metal tubes have been made of steel or the like and have been joined to one another by means of heavy lugs, braces or sleeves and held in place by soldering, brazing or the like. Recent advances in material sciences have made it possible to construct frames using lightweight metals (such as aluminum) or even non-metallic composite materials. The use of these lightweight materials in bicycle frames has made dramatic reductions in bicycle weight possible.

Traditional methods of joining frame tube segments are often incompatible with the new tube materials. High performance adhesives have now come into use in forming tube joints. These adhesives present their own set of design problems among which are the uniform distribution of the high performance adhesive about the joint and the application of the adhesive in a layer of optimum thickness so as to achieve proper adhesive bonding.

SUMMARY OF THE INVENTION

This invention pertains to an improvement in the structure of a bicycle frame, in particular to an improved design for the joining components of each bar of the bicycle frame, said joining component being formed by an inner lug and an outer lug. The inner lug consists of a first external diameter and a second external diameter, the second external diameter being smaller than the first external diameter. The circumference of the second external diameter is provided with a number of flanges which run axially. The circumference of these flanges is equal to the first external diameter. The aperture of the outer lug is also provided with a first internal diameter and a second internal diameter. The first internal diameter is approximately equal to the first external diameter, and the second internal diameter is approximately equal to the second external diameter. When the outer lug is joined to the inner lug, the depth of the first internal diameter is larger than or equal to that of the first external diameter.

When the length of the flanges is added, the outermost end of the first internal diameter covers the first external diameter. The outer edge of the second internal diameter covers the portions of the second external diameter which do not have flanges. By using this structure with an adhesive, a superior adhesive effect can be obtained, thus assuring the quality of the seal, and achieving a high strength bicycle frame with a unique structural design.

EXPLANATION OF THE FIGURES

FIGS. 3-1, 3-2 and 3-3 shows the invention as assembled.

FIGS. 7-1 and 7-2 shows that in the assembled joint the length of the Second External diameter is greater than the depth of the First Internal Diameter.

FIG. 8-1 and 8-2 shows that in an assembled joint, the length of the second external diameter is smaller than the depth of the first internal diameter.

DETAILED DESCRIPTION OF THE INVENTION

This invention pertains to an improvement in the structure of a bicycle frame, and, in particular, to a design for joining components, by means of which a good joining effect can be obtained, and the structural strength of the bicycle frame improved.

Figure 1:
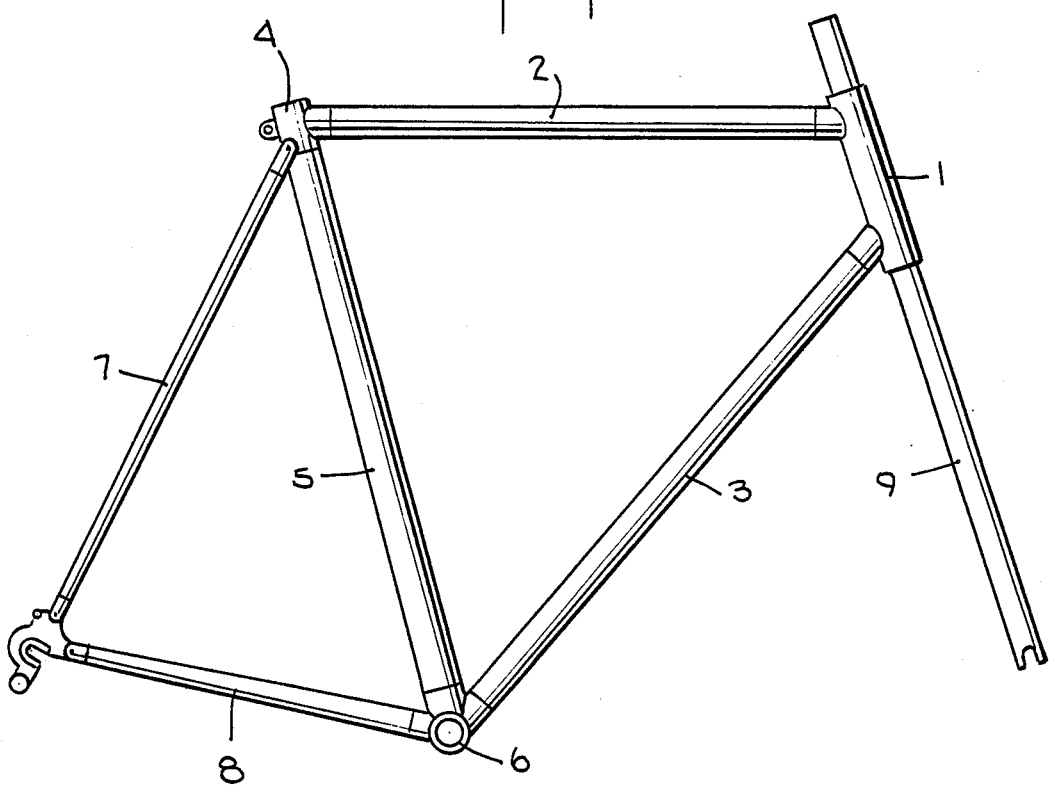
FIG. 1 is a plane view of the invention.

One can see from FIG. 1 that the usual bicycle frame consists of a front bar (1), an upper bar, (2), a lower bar (3), a seat bar (4), an upright bar (5), a larger or pedal axis joint (6), a rear fork upper support frame (7), a rear fork lower support frame (8), and a front fork. (9). The front wheel is fixed by the front fork (9), and the rear wheel is supported by the rear fork. The pedals and the pedal crank rods are attached to the large or pedal axis joint (6).

Figure 5:
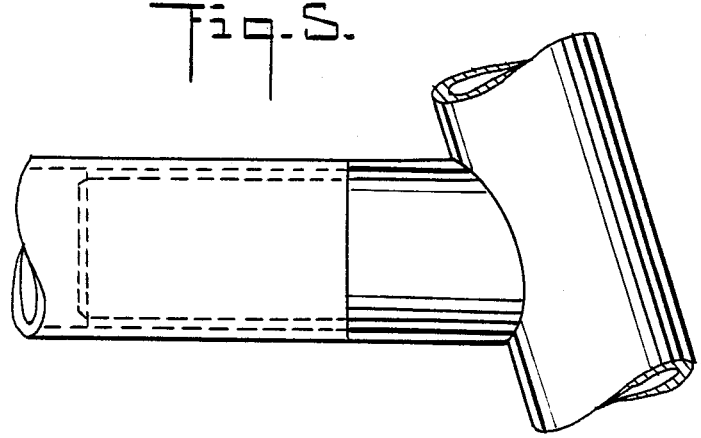
FIG. 5 shows a "cut-away" view of the assembled invention.

In the large majority of bicycles, most of the components are made from steel, and these components are welded together. However, steel components are relatively heavy and make the entire structure clumsy. Agility and acceleration are lost. Apart from this drawback, manufacturing by welding is inconvenient, especially in mass production. Also, the original strength of the materials used is lowered when the bicycle frame bars are subjected to high temperature heating. Among the rapid development of every sort of vehicle today, the bicycle tends to enjoy a recreational and leisure use. The desired characteristic in the design of racing bicycles and dirt bikes is reduced body weight and increased body strength. Aluminum alloys are presently, as a result, among the most suitable materials. Aluminum not only has the desired strength but also the advantage of being light, and most bicycle frames now employ aluminum alloys. In those bicycle frames that use aluminum alloys, most use peg and lug type joints. A layer of adhesive is coated onto the peg and allowed to set, and this prevents loosening. Peg and lug form a tight planar seal, however, and when the two are joined (as is shown in FIG. 5), the peg can strip off adhesive forming a bubble between the two joining elements. The lack of adhesive can effect the strength of the joint. This can in turn affect the quality of the goods, and even the requirements for a safe use may not be met. Much the same considerations are also present in frames when they are made from aluminum, chromalloy, or non-metallic composite materials. This invention improves the design of all such joining components and high strength component joints. As a result of this invention a joint with uniform adhesive application and an enhanced adhesive strength has been achieved, thus increasing the structural strength.

Figure 2:
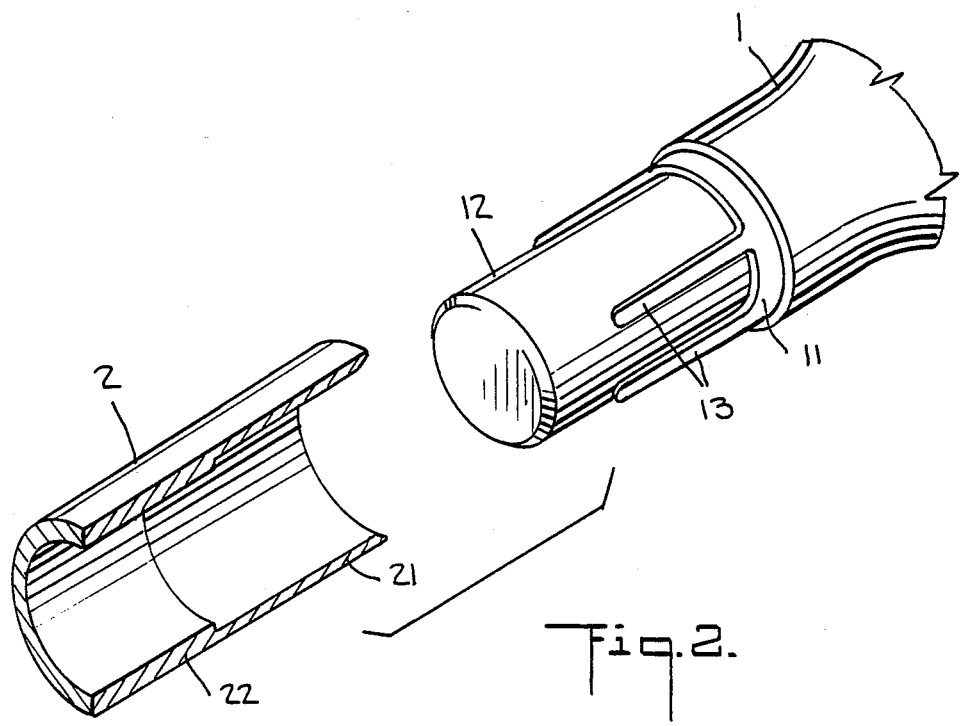
FIG. 2 is an external view of the joining components when disassembled.
Figures 1, 7:
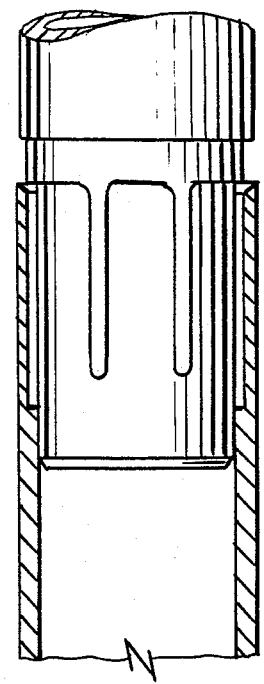
Figures 2, 7:
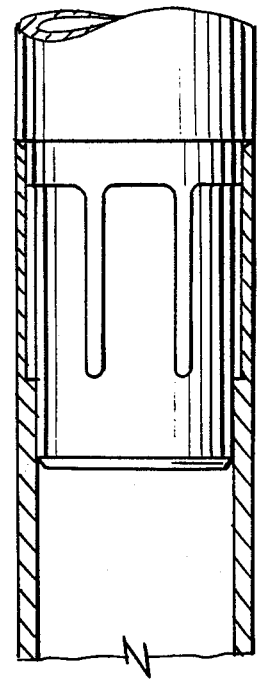

Referring now to FIGS. 7-1 and 7-2, we see the structure of the invention as assembled, which has already been discussed and will not be discussed again in detail. The main improvements proposed by this invention consist of improvements in the structure of the joining components, and only the joints for the front bar (1) and the upper bar (2) will be discussed. The remaining joints are similar.

Figures 1, 3:
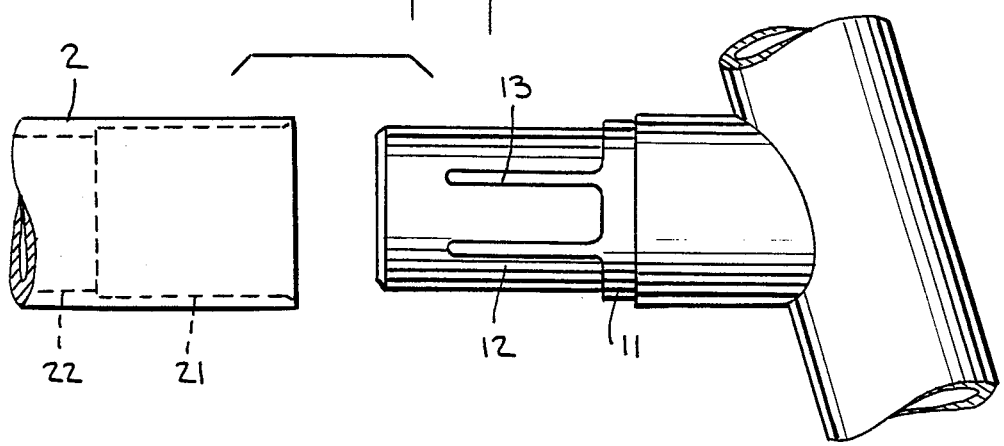
Figures 2, 3:
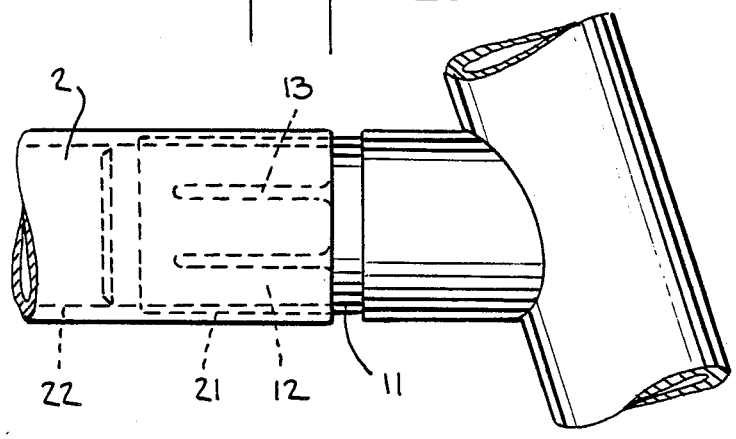
Figure 3:
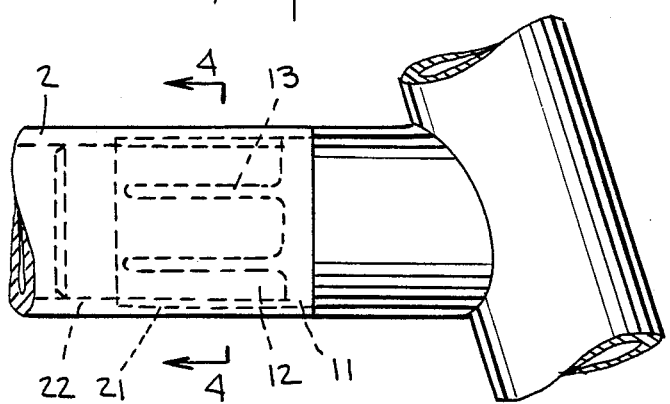
Figure 4:
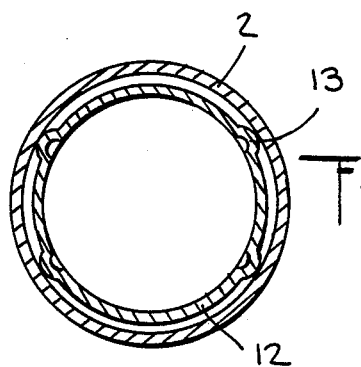
FIG. 4 shows a "face on" view of the invention.

In FIGS. 2–4, one end of the front bar (1) extends into an inner lug having an axis. This lug can be a part of the front bar, or can be inserted in it, or can be joined to it by some other means. This inner lug is provided with a first external diameter (11) and a second external diameter (12). The first external diameter (11) is larger than the second external diameter. Moreover, the circumference of the second external diameter (12) is provided with numerous flanges (13), whose length is less than that of the second external diameter (12). The circumference of these flanges (13) is equal to that of the first external diameter. The upper bar (2) forms a hollow lug having an axis, the aperture of which is provided with a first internal diameter (21) and a second internal diameter (22). The first internal diameter (21), which faces the outside is about as large as the first external diameter (11), and the second internal diameter (22) is about as large as the second external diameter. The length of the first internal diameter (21) is about as large or equal to the length of the flanges (13) on the first external diameter. The length of the first internal diameter is shorter than that of the second external diameter. Given this, the invention is assembled as in FIG. 3.

Figure 6:
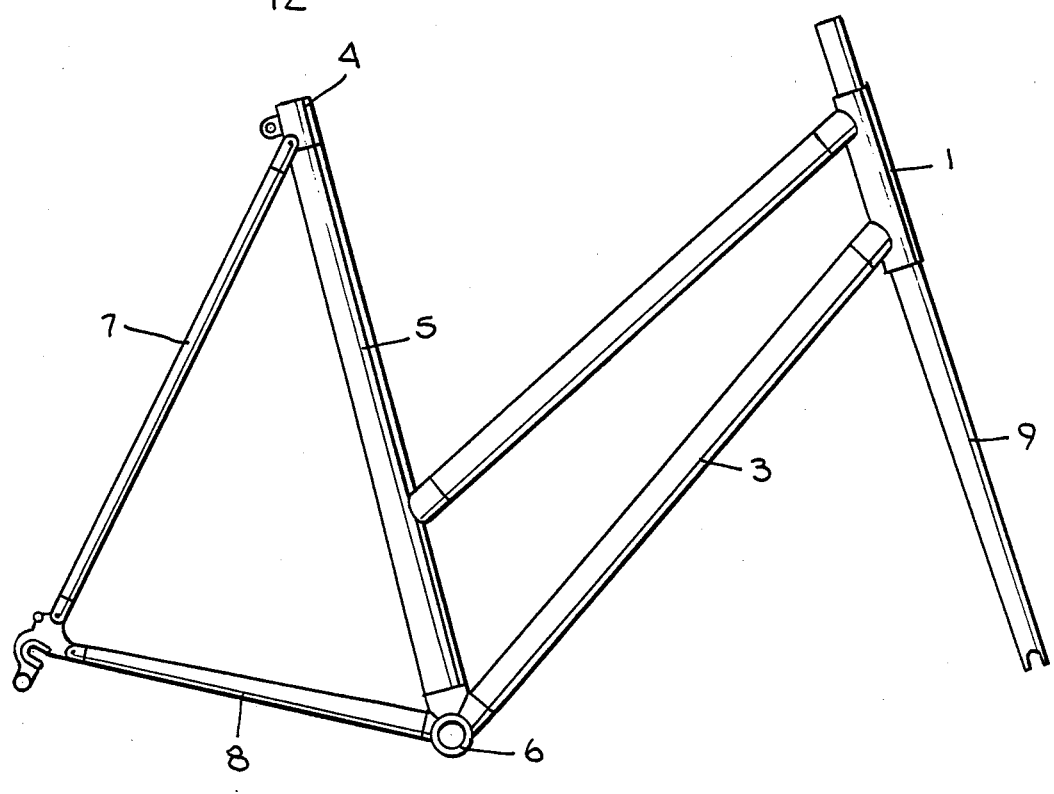
FIG. 6 shows another practical application of the invention (a girl's bicycle).
Figures 1, 8:
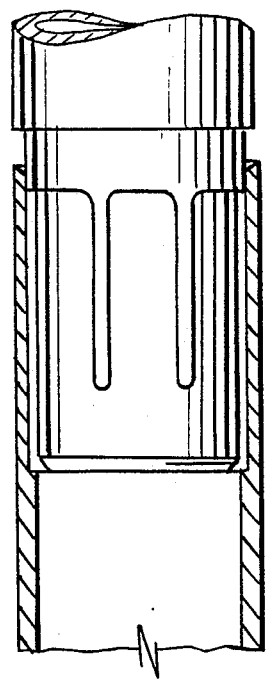
Figures 2, 8:
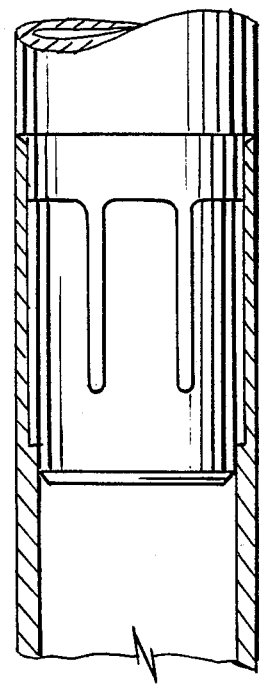

When the invention is assembled, an adhesive must be coated on the external diameter of the inner lug, and on the internal diameter of the external lug. When the first internal diameter (21) covers the end of the second external diameter (12) only the flanges (13) are in contact (as in FIG. 4). Consequently, the adhesive cannot be stripped away, forming an unglued surface, or non-uniformity in the adhesive, destroying the adhesive effect. When the first internal diameter (22) is in contact with the first external diameter (12), the second internal diameter already covers the second external diameter (see FIG. 3-2), and the outside of the second external diameter (12) forms a nearly sealed space over the flanges (13). When one then continues to push the joining elements together, the second internal diameter and the first external diameter can force off a portion of adhesive, extruding it towards the aforementioned space and ensuring that the adhesive adheres to the bonding surfaces and fills the bonding spaces. After the adhesive hardens, an excellent joining effect is obtained. This method of joining components is suitable for use with steel (and its alloys) with aluminum, carbon fibers, fiber glass or with other identical or dissimilar pairs of materials. This invention can be modified by changing the first internal diameter and the length of the second external diameter. If the depth of the first internal diameter is greater than the length of the second external diameter, the distribution of the adhesive can be unequal, without affecting the joining strength. Changing the position of the upright bar (5) results in FIG. 6, which is suitable for women's bicycles.

By way of example, the following dimensions may be offered to illustrate the configuration of a joint used in a frame according to the present invention. The first external diameter section will have an external diameter of 25.33 mm and a length of 26.00 mm and the second external diameter section will have an external diameter of 25.47 mm and a length of 7.5 mm. The first internal diameter section will have an internal diameter of 25.60 mm and a length of 28.00 mm and the second internal diameter section will have an internal diameter of 25.45 mm.

I claim:

1. A bicycle frame comprising a plurality of tubular frame sections wherein one tube section having an inner lug is joined to an end of another tube section having an outer lug;

said inner lug having an axis and comprising a first external portion having a first external circumference defined by a first external diameter, said first external portion comprising at least two flange members extending along said inner lug axis; and said inner lug further comprising a second external portion having a second external circumference defined by a second external diameter; said first external diameter being greater than said second external diameter, said flange members and said second external portion having an axial length with the axial length of said second external portion being greater than the axial length of said flange members;

said outer lug being located at said end of said another tube section with said outer lug having a free end; said outer lug comprising a first aperture portion and a second aperture portion; said first aperture portion being at the free end of said outer lug and having a first internal circumference defined by a first internal diameter; said second aperture portion having a second internal circumference defined by a second internal diameter; wherein said first internal diameter of said outer lug is greater than said first external diameter of said inner lug and said second internal diameter of said outer lug; and wherein said second internal diameter of said outer lug is greater than said second external diameter of said inner lug; with said first aperture portion of said outer lug having an axial length greater than or equal to that of said first external portion of said inner lug;

said outer lug receiving said inner lug thereby forming a space therebetween with an adhesive disposed in said space.

2. A bicycle frame according to claim 1 wherein said inner lug is integrally formed as part of the end of said one tube section.

3. A bicycle frame according to claim 2 wherein said tube sections are formed from materials selected from the group consisting of aluminum, chromalloy and non-metallic composites.

* * * * *